(12) United States Patent
Choi et al.

(10) Patent No.: US 10,144,401 B2
(45) Date of Patent: Dec. 4, 2018

(54) INSPECTION VALVE

(71) Applicant: MANDO CORPORATION, Gyeonggi-do (KR)

(72) Inventors: Seong-Ho Choi, Gyeonggi-do (KR); In-Wook Jeon, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/600,650

(22) Filed: May 19, 2017

(65) Prior Publication Data

US 2017/0334417 A1    Nov. 23, 2017

(30) Foreign Application Priority Data

May 20, 2016  (KR) .......................... 10-2016-0062060

(51) Int. Cl.
*B60T 13/74* (2006.01)
*B60T 13/68* (2006.01)
(Continued)

(52) U.S. Cl.
CPC .............. *B60T 13/68* (2013.01); *B60T 8/341* (2013.01); *B60T 8/442* (2013.01); *B60T 8/5031* (2013.01);
(Continued)

(58) Field of Classification Search
CPC .......... B60T 13/68; B60T 13/686; B60T 8/50; B60T 8/442; B60T 8/5031
(Continued)

(56) References Cited

U.S. PATENT DOCUMENTS 4,712,767 A * 12/1987 Losser .................... B60T 8/363
                                                  251/129.14
5,423,602 A *  6/1995 Takahashi ............... B60T 8/363
                                                  251/129.19
(Continued)

FOREIGN PATENT DOCUMENTS

EP           2 520 473       11/2012

*Primary Examiner* — Christopher P Schwartz
(74) *Attorney, Agent, or Firm* — Ladas & Parry, LLP (57) ABSTRACT

According to the embodiment of the present disclosure, it provides an inspection valve installed at a flow path connecting a reservoir to a chamber of a master cylinder, comprising: a housing at which a bore is formed and having one side at which an inlet hole is formed; a plunger provided to be movable along the bore of the housing; a seat member configured to close one side of the bore and through which an outlet hole passes; and an elastic member having one side supported by the plunger and the other side supported by the seat member, wherein the plunger is provided to block the outlet hole when a hydraulic pressure flowing in through the inlet hole is greater than an elastic force of the elastic member.

Also, according to the embodiment of the present disclosure, it provides an inspection valve installed at a bypass flow path connecting a front side of a check valve to a rear side thereof at a reservoir flow path connecting a reservoir to a master cylinder, comprising: a housing at which a bore is formed and having one side at which an inlet hole communicating with the master cylinder is formed; a plunger provided to be movable along the bore of the housing; a seat member configured to close one side of the bore and through which an outlet hole communicating with the reservoir passes; and an elastic member having one side supported by the plunger and the other side supported by the seat member, wherein the check valve is provided at the reservoir flow path and enables fluid to flow in a direction from the reservoir to the (Continued)

master cylinder, and the plunger is provided to block the outlet hole when a hydraulic pressure flowing in through the inlet hole is greater than an elastic force of the elastic member.

15 Claims, 8 Drawing Sheets

(51) Int. Cl.
  *B60T 8/44* (2006.01)
  *B60T 8/50* (2006.01)
  *B60T 8/34* (2006.01)
  *B60T 8/40* (2006.01)
  *B60T 13/66* (2006.01)
  *B60T 8/38* (2006.01)

(52) U.S. Cl.
  CPC ............... *B60T 13/686* (2013.01); *B60T 8/38* (2013.01); *B60T 8/4081* (2013.01); *B60T 8/441* (2013.01); *B60T 8/5025* (2013.01); *B60T 13/66* (2013.01)

(58) Field of Classification Search
  USPC ............................. 303/9.62, 15, 113.4, 114.1
  See application file for complete search history.

(56) References Cited

U.S. PATENT DOCUMENTS

| | | | | |
|---|---|---|---|---|
| 5,531,513 A * | 7/1996 | Tackett | .................. | B60T 8/4068 |
| | | | | 137/494 |
| 6,199,587 B1 * | 3/2001 | Shlomi | .................. | F16K 31/082 |
| | | | | 137/625.5 |
| 9,308,905 B2 * | 4/2016 | Biller | .................... | B60T 8/4081 |
| 9,415,758 B2 * | 8/2016 | Drumm | .................. | B60T 17/22 |
| 2002/0084691 A1 * | 7/2002 | Isono | .................... | B60T 8/4081 |
| | | | | 303/10 |
| 2002/0084693 A1 * | 7/2002 | Isono | .................... | B60T 8/4081 |
| | | | | 303/113.1 |
| 2006/0214504 A1 * | 9/2006 | Kusano | .................. | B60K 6/365 |
| | | | | 303/113.4 |
| 2014/0028084 A1 * | 1/2014 | Biller | .................... | B60T 8/4081 |
| | | | | 303/9.62 |
| 2017/0072929 A1 * | 3/2017 | Kim | ........................ | B60T 7/042 |
| 2017/0106846 A1 * | 4/2017 | Kim | ........................ | B60T 8/348 |
| 2017/0106849 A1 * | 4/2017 | Yun | ......................... | B60T 8/368 |
| 2017/0144642 A1 * | 5/2017 | Kim | ........................ | B60T 7/042 |
| 2017/0144643 A1 * | 5/2017 | Kim | ........................ | B60T 7/042 |
| 2017/0144644 A1 * | 5/2017 | Kim | ........................ | B60T 13/146 |
| 2017/0158180 A1 * | 6/2017 | Kim | ........................ | B60T 7/042 |
| 2017/0158184 A1 * | 6/2017 | Choi | ..................... | B60T 8/4081 |
| 2017/0210369 A1 * | 7/2017 | Lim | ........................ | B60T 7/042 |
| 2018/0111593 A1 * | 4/2018 | Kim | ..................... | B60T 13/686 |
| 2018/0111594 A1 * | 4/2018 | Kim | ..................... | B60T 13/745 |

* cited by examiner

INSPECTION VALVE

This application claims the benefit of Korean Patent Application No. 2016-0062060, filed on May 20, 2016 in the Korean Intellectual Property Office, the disclosure of which is incorporated herein by reference.

BACKGROUND

1. Field

Embodiments of the present disclosure relate to an inspection valve, and more particularly, to an inspection valve installed at a flow path connecting a reservoir to a chamber of a master cylinder.

2. Description of the Related Art

A brake system for braking is necessarily mounted on a vehicle, and a variety of systems for providing stronger and more stable braking force have been proposed recently.

For example, there are brake systems including an anti-lock brake system (ABS) for preventing a wheel from sliding while braking, a brake traction control system (BTCS) for preventing a driving wheel from slipping when a vehicle is suddenly unintendedly accelerated or intentionally accelerated, an electronic stability control (ESC) system for stably maintaining a driving state of a vehicle by combining an ABS with traction control to control a hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies a hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor operates according to a pedal effort of a brake pedal to generate a braking pressure. At this point, the braking pressure is generated by converting a rotational force of the motor into a rectilinear movement to pressurize a piston.

PRIOR ART DOCUMENT

Patent Document

European Registered Patent No. EP 2 520 473 A1 (Honda Motor Co., Ltd.), Nov. 7, 2012.

SUMMARY

Therefore, it is an aspect of the present disclosure to provide an electric brake system in which an inspection mode is executed.

Additional aspects of the disclosure will be set forth in part in the description which follows and, in part, will be obvious from the description, or may be learned by practice of the disclosure.

According to the embodiment of the present disclosure, it provides an inspection valve installed at a flow path connecting a reservoir to a chamber of a master cylinder, comprising: a housing at which a bore is formed and having one side at which an inlet hole is formed; a plunger provided to be movable along the bore of the housing; a seat member configured to close one side of the bore and through which an outlet hole passes; and an elastic member having one side supported by the plunger and the other side supported by the seat member, wherein the plunger is provided to block the outlet hole when a hydraulic pressure flowing in through the inlet hole is greater than an elastic force of the elastic member.

Also, according to the embodiment of the present disclosure, the bore includes a first bore adjacent to the inlet hole, and a second bore having an inner diameter that is greater than that of the first bore, and the seat member is press inserted into and fixed to the second bore.

Also, according to the embodiment of the present disclosure, an opening and closing member protrudes from one side of the plunger, and the plunger is provided to be moved by the hydraulic pressure, thereby enabling the opening and closing member to block the outlet hole.

Also, according to the embodiment of the present disclosure, the seat member includes a seating part that is provided to extend from one side of the outlet hole, and the opening and closing member is seated at the seating part to block the outlet hole.

Also, according to the embodiment of the present disclosure, the inlet hole communicates with the chamber of the master cylinder, and the outlet hole communicates with the reservoir.

According to the embodiment of the present disclosure, it provides an inspection valve installed at a bypass flow path connecting a front side of a check valve to a rear side thereof at a reservoir flow path connecting a reservoir to a master cylinder, comprising: a housing at which a bore is formed and having one side at which an inlet hole communicating with the master cylinder is formed; a plunger provided to be movable along the bore of the housing; a seat member configured to close one side of the bore and through which an outlet hole communicating with the reservoir passes; and an elastic member having one side supported by the plunger and the other side supported by the seat member, wherein the check valve is provided at the reservoir flow path and enables fluid to flow in a direction from the reservoir to the master cylinder, and the plunger is provided to block the outlet hole when a hydraulic pressure flowing in through the inlet hole is greater than an elastic force of the elastic member.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

Figure 1:
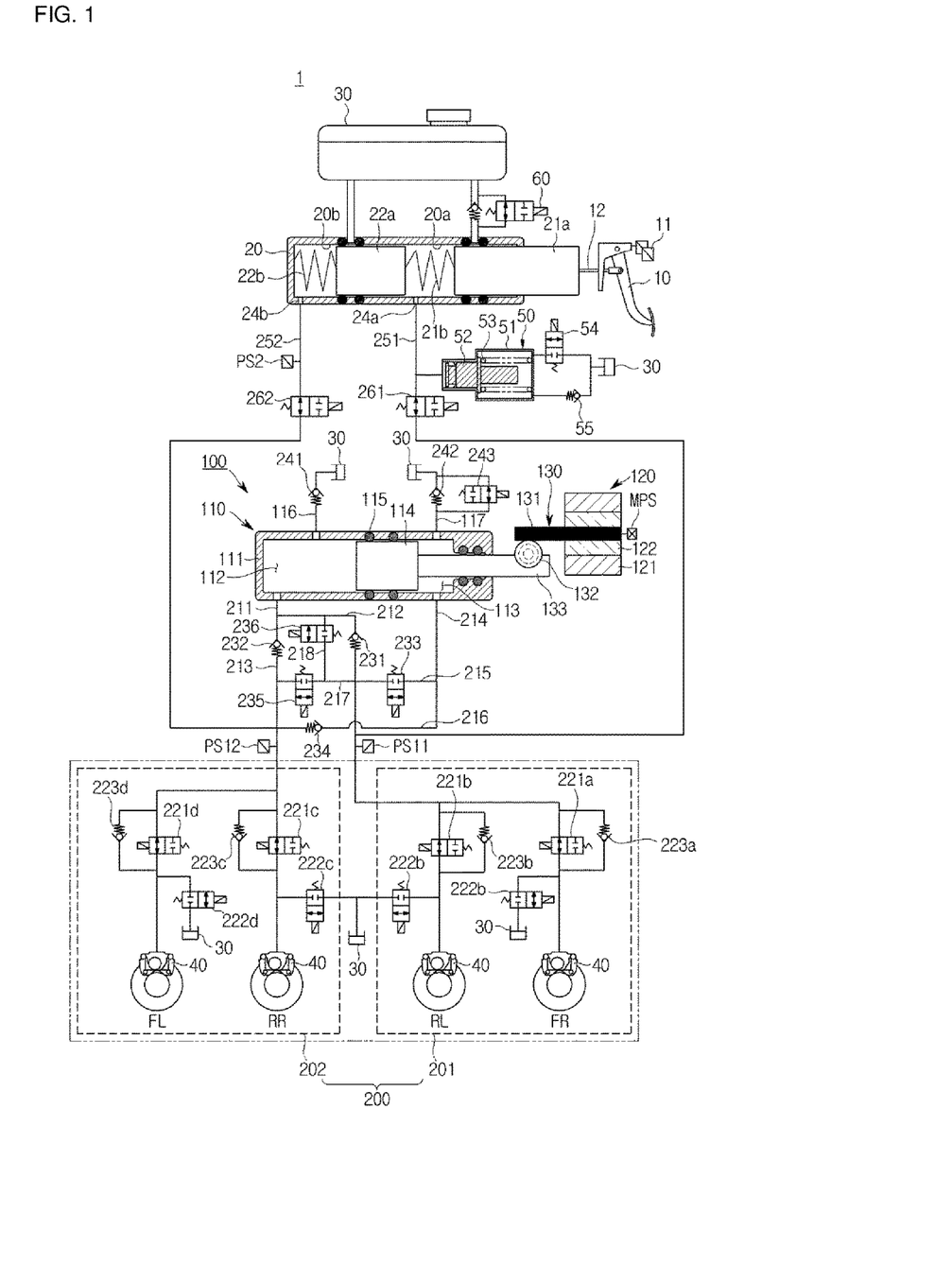
FIG. 1 is a hydraulic pressure circuit diagram illustrating a non-braking state of an electric brake system according to an embodiment of the present disclosure.

FIG. 1 is a hydraulic pressure circuit diagram illustrating a non-braking state of an electric brake system 1 according to an embodiment of the present disclosure.

Referring to FIG. 1, the electric brake system 1 generally includes a master cylinder 20 configured to generate a hydraulic pressure, a reservoir 30 coupled to an upper part of the master cylinder 20 to store oil, an input rod 12 configured to pressurize the master cylinder 20 according to a pedal effort of a brake pedal 10, a wheel cylinder 40 configured to receive the hydraulic pressure and perform braking of each of wheels RR, RL, FR, and FL, a pedal displacement sensor 11 configured to sense a displacement of the brake pedal 10, and a simulation device 50 configured to provide a reaction force according to the pedal effort of the brake pedal 10.

The master cylinder 20 may be configured to include at least one chamber to generate a hydraulic pressure. As one example, the master cylinder 20 may be provided with a first master chamber 20a and a second master chamber 20b.

Figure 2:
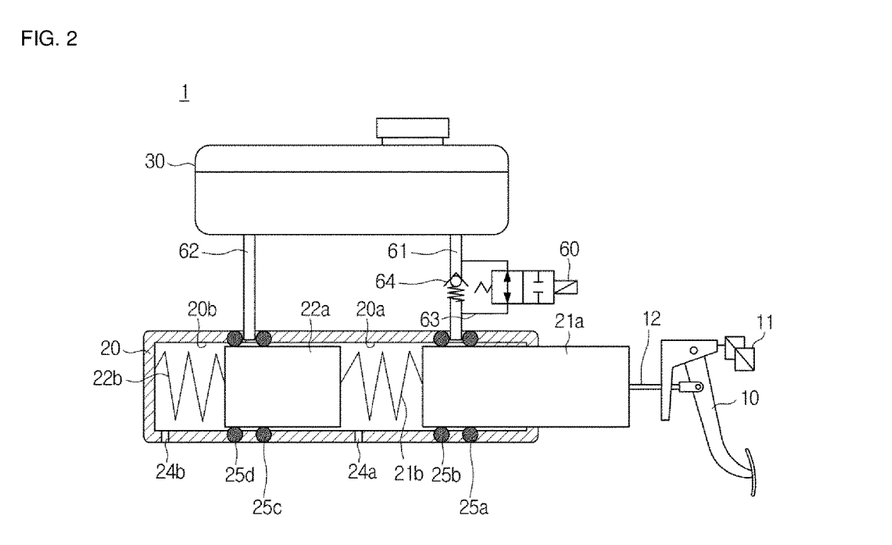
FIG. 2 is an enlarged diagram illustrating the master cylinder according to the embodiment of the present disclosure.

Next, the master cylinder 20 according to the embodiment of the present disclosure will be described with reference to FIG. 2. FIG. 2 is an enlarged diagram illustrating the master cylinder 20 according to the embodiment of the present disclosure.

A first piston 21a connected to the input rod 12 is provided in the first master chamber 20a, and a second piston 22a is provided in the second master chamber 20b. Further, the first master chamber 20a communicates with a first hydraulic pressure port 24a to enable oil to flow in and out, and the second master chamber 20b communicates with a second hydraulic pressure port 24b to enable the oil to flow in and out. As one example, the first hydraulic pressure port 24a may be connected to a first backup flow path 251, and the second hydraulic pressure port 24b may be connected to a second backup flow path 252.

Meanwhile, the master cylinder 20 may include the two master chambers 20a and 20b to secure safety when one chamber fails. For example, the first master chamber 20a of the two master chambers 20a and 20b may be connected to a front right wheel FR and a rear left wheel RL of a vehicle through the first backup flow path 251, and the second master chamber 20b thereof may be connected to a front left wheel FL and a rear right wheel RR through the second backup flow path 252. As is described above, the two master chambers 20a and 20b may be independently configured so that braking of a vehicle may be possible even when one of the two master chambers 20a and 20b fails.

Also, unlike the drawings, one of the two master chambers may be connected to two front wheels FR and FL and the remaining master chamber may be connected to two rear wheels RR and RL. In addition to the described above, one of the two master chambers may be connected to the front left wheel FL and the rear left wheel RL, and the remaining master chamber may be connected to the rear right wheel RR and the front right wheel FR. That is, a variety of connected configurations may be established between the master chambers of the master cylinder 20 and the wheels.

Also, a first spring 21b may be provided between the first piston 21a and the second piston 22a of the master cylinder 20, and a second spring 22b may be provided between the second piston 22a and an end part of the master cylinder 20. That is, the first piston 21a may be accommodated in the first master chamber 20a, and the second piston 22a may be accommodated in the second master chamber 20b.

The first spring 21b and the second spring 22b are respectively compressed by the first piston 21a and the second piston 22a which are moved according to a varied displacement of the brake pedal 10, thereby storing an elastic force. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 configured to pressurize the first piston 21a of the master cylinder 20 may come into close contact with the first piston 21a. That is, there may be no gap between the master cylinder 20 and the input rod 12. Consequently, when the brake pedal 10 is stepped on, the master cylinder 20 may be directly pressurized without a pedal dead stroke section.

Also, the first master chamber 20a may be connected to the reservoir 30 through a first reservoir flow path 61, and the second master chamber 20b may be connected to the reservoir 30 through a second reservoir flow path 62.

Also, the master cylinder 20 may include two sealing members 25a and 25b which are disposed in front and rear of the first reservoir flow path 61, and two sealing members 25c and 25d which are disposed in front and rear of the second reservoir flow path 62. The sealing members 25a, 25b, 25c, and 25d may respectively have a ring shape that protrudes from an inner wall of the master cylinder 20 or from an outer circumferential surface of each of the pistons 21a and 22a.

Also, a check valve 64 may be provided at the first reservoir flow path 61 to enable oil to flow from the reservoir 30 to the first master chamber 20a and block oil from flowing from the first master chamber 20a to the reservoir 30. The check valve 64 may be provided to enable fluid to flow in one direction.

Further, a front side and a rear side of the check valve 64 of the first reservoir flow path 61 may be connected to each other through a bypass flow path 63. Also, an inspection valve 60 may be provided at the bypass flow path 63.

The inspection valve 60 may be provided with a bidirectional control valve which controls an oil flow between the reservoir 30 and the master cylinder 20. Further, the inspection valve 60 may be configured with a normally open type solenoid valve that is usually open and is closed when a closing signal is received from an electronic control unit (ECU).

A detailed function and an operating process of the inspection valve 60 will be described below.

The simulation device 50 may be connected to the first backup flow path 251, which will be described below, to provide a reaction force according to a pedal effort of the brake pedal 10. The reaction force may be provided to compensate for a pedal effort provided from a driver such that a braking force may be finely controlled as intended by the driver.

Referring to FIG. 1, the simulation device 50 includes a simulation chamber 51 provided to store oil flowing from the first hydraulic pressure port 24a of the master cylinder 20, a reaction force piston 52 provided inside the simulation chamber 51, a pedal simulator provided with a reaction force spring 53 that is configured to elastically support the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by oil flowing therein.

Meanwhile, the reaction force spring 53 shown in the drawing is merely one embodiment capable of providing an elastic force to the reaction force piston 52, and thus it may include numerous embodiments capable of storing the elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting the rear end part of the simulation chamber 51 to the reservoir 30. A front end part of the simulation chamber 51 may be connected to the master cylinder 20, and the rear end part of the simulation chamber 51 may be connected to the reservoir 30 through the simulator valve 54. Therefore, even when the reaction force piston 52 returns, oil in the reservoir 30 may flow in the simulation chamber 51 through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. Here, these reservoirs 30 may be configured with the same components, and may alternatively be configured with different components. As one example, the reservoir 30 connected to the simulation device 50 may be the same as the reservoir 30 connected to the master cylinder 20, or may be a storage part capable of storing oil separately from the reservoir 30 that is connected to the master cylinder 20.

Meanwhile, the simulator valve 54 may be configured with a normally closed type solenoid valve that usually maintains a closed state. When the driver applies a pedal effort to the brake pedal 10, the simulator valve 54 may be open to deliver oil in the simulation chamber 51 to the reservoir 30.

Also, a simulator check valve 55 may be installed to be connected in parallel with the simulator valve 54 between the pedal simulator and the reservoir 30. The simulator check valve 55 may enable the oil in the reservoir 30 to flow toward the simulation chamber 51 and may block the oil in the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil in the simulation chamber 51, which is pushed by the reaction force piston 52 of the pedal simulator while the reaction force piston 52 pressurizes the reaction force spring 53, is delivered to the reservoir 30 through the simulator valve 54, and then a pedal feeling is provided to the driver through such an operating process. Further, when the driver releases the pedal effort from the brake pedal 10, the reaction force spring 53 may push the reaction force piston 52 to return the reaction force piston 52 to its original state, and the oil in the reservoir 30 may flow inside the simulation chamber 51 through the flow path at which the simulator valve 54 is installed and the flow path at which the simulator check valve 55 is installed, thereby completely filling the inside of the simulation chamber 51 with the oil.

As is described above, since the inside of the simulation chamber 51 is in a state in which the oil is always filled therein, friction of the reaction force piston 52 is minimized when the simulation device 50 operates, and thus durability of the simulation device 50 may be improved and further introduction of foreign materials from the outside may be blocked.

The electric brake system 1 according to the embodiment of the present disclosure may include a hydraulic pressure supply device 100 configured to receive a braking intent of a driver in the form of an electrical signal from the pedal displacement sensor 11 sensing a displacement of the brake pedal 10, and to operate mechanically, a hydraulic pressure control unit 200 including first and second hydraulic pressure circuits 201 and 202 configured to control delivery of a hydraulic pressure which is delivered to the wheel cylinders 40 which are respectively provided at two wheels among the wheels RR, RL, FR, and FL, a first cut valve 261 provided at the first backup flow path 251 connecting the first hydraulic pressure port 24a to the first hydraulic pressure circuit 201 and configured to control the delivery of the hydraulic pressure, a second cut valve 262 provided at the second backup flow path 252 connecting the second hydraulic pressure port 24b to the second hydraulic pressure circuit 202 and configured to control the delivery of the hydraulic pressure, and the ECU (not shown) configured to control the hydraulic pressure supply device 100 and valves 54, 60, 221a, 221b, 221c, 221d, 222a, 222b, 222c, 222d, 233, 235, 236, and 243 on the basis of hydraulic pressure information and pedal displacement information.

The hydraulic pressure supply device 100 may include a hydraulic pressure supply unit 110 configured to provide an oil pressure delivered to the wheel cylinders 40, a motor 120 configured to generate a rotational force in response to an electrical signal from the pedal displacement sensor 11, and a power converter 130 configured to convert a rotational movement of the motor 120 into a rectilinear movement and transmit the rectilinear movement to the hydraulic pressure supply unit 110. Alternatively, the hydraulic pressure supply unit 110 may operate by a pressure provided from a high-pressure accumulator instead of a driving force supplied from the motor 120.

Figure 3:
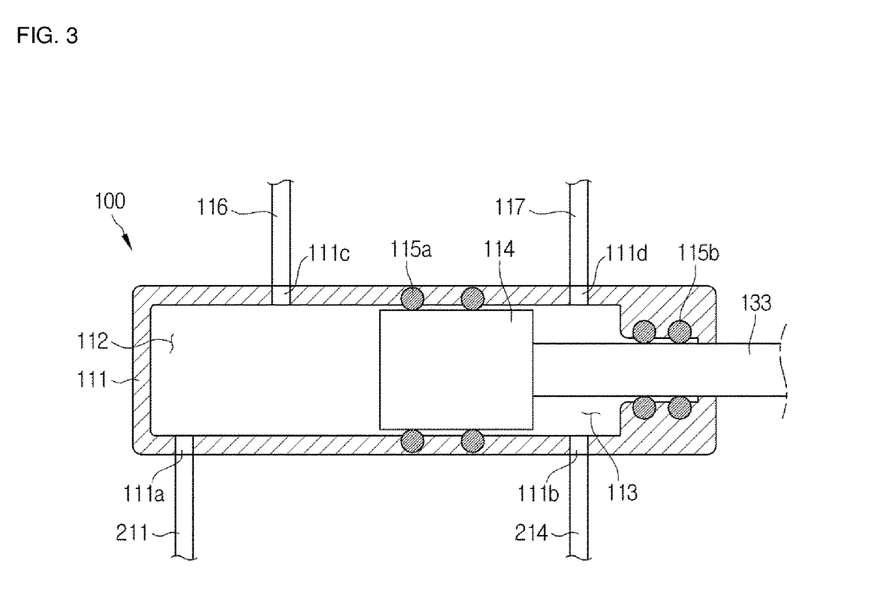
FIG. 3 is an enlarged diagram of the hydraulic pressure supply unit according to the embodiment of the present disclosure.

Next, the hydraulic pressure supply unit 110 according to the embodiment of the present disclosure will be described with reference to FIG. 3. FIG. 3 is an enlarged diagram of the hydraulic pressure supply unit 110 according to the embodiment of the present disclosure.

The hydraulic pressure supply unit 110 includes a cylinder block 111 in which a pressure chamber configured to receive and store oil is formed, a hydraulic piston 114 accommodated inside the cylinder block 111, sealing members 115

(that is, 115a and 115b) provided between the hydraulic piston 114 and the cylinder block 111 and configured to seal the pressure chamber, and a driving shaft 133 connected to a rear end part of the hydraulic piston 114 and configured to transmit power, which is output from the power converter 130, to the hydraulic piston 114.

The pressure chamber may include a first pressure chamber 112 located at a front side (in a forward movement direction, that is, a left direction on the drawing) of the hydraulic piston 114, and a second pressure chamber 113 located at a rear side (in a backward movement direction, that is, a right direction on the drawing) of the hydraulic piston 114. That is, the first pressure chamber 112 is comparted by the cylinder block 111 and a front end part of the hydraulic piston 114 and is provided to have a volume that varies according to a movement of the hydraulic piston 114, and the second pressure chamber 113 is comparted by the cylinder block 111 and the rear end part of the hydraulic piston 114 and is provided to have a volume that varies according to the movement of the hydraulic piston 114.

The first pressure chamber 112 is connected to a first hydraulic flow path 211 through a first communicating hole 111a formed at a rear side of the cylinder block 111, and is connected to a fourth hydraulic flow path 214 through a second communicating hole 111b formed at a front side of the cylinder block 111. The first hydraulic flow path 211 connects the first pressure chamber 112 to the first and second hydraulic pressure circuits 201 and 202. Further, the first hydraulic flow path 211 branches off into a second hydraulic flow path 212 communicating with the first hydraulic pressure circuit 201, and a third hydraulic flow path 213 communicating with the second hydraulic pressure circuit 202. The fourth hydraulic flow path 214 connects the second pressure chamber 113 to the first and second hydraulic pressure circuits 201 and 202. Further, the fourth hydraulic flow path 214 branches off into a fifth hydraulic flow path 215 communicating with the first hydraulic pressure circuit 201, and a sixth hydraulic flow path 216 communicating with the second hydraulic pressure circuit 202.

The sealing member 115 includes a piston sealing member 115a provided between the hydraulic piston 114 and the cylinder block 111 to seal between the first pressure chamber 112 and the second pressure chamber 113, and a driving shaft sealing member 115b provided between the driving shaft 133 and the cylinder block 111 to seal an opening between the second pressure chamber 113 and the cylinder block 111. That is, a hydraulic pressure or a negative pressure of the first pressure chamber 112, which is generated while the hydraulic piston 114 is moved forward or backward, may be blocked by the piston sealing member 115a and may be delivered to the first and fourth hydraulic flow paths 211 and 214 without leaking into the second pressure chamber 113. Further, a hydraulic pressure or a negative pressure of the second pressure chamber 113, which is generated while the hydraulic piston 114 is moved forward or backward, may be blocked by the driving shaft sealing member 115b and may not leak into the cylinder block 111.

The first and second pressure chambers 112 and 113 may be respectively connected to the reservoir 30 by dump flow paths 116 and 117, and may receive and store oil supplied from the reservoir 30 or deliver oil in the first or second pressure chamber 112 or 113 to the reservoir 30. As one example, the dump flow paths 116 and 117 may include a first dump flow path 116 branching off from the first pressure chamber 112 and connected to the reservoir 30, and a second dump flow path 117 branching off from the second pressure chamber 113 and connected to the reservoir 30.

Also, the first pressure chamber 112 may be connected to the first dump flow path 116 through a fifth communicating hole 111f formed at a front side, and the second pressure chamber 113 may be connected to the second dump flow path 117 through a sixth communicating hole 111e formed at a rear side.

Further, the first communicating hole 111a communicating with the first hydraulic flow path 211 may be formed at a front side of the first pressure chamber 112, and the second communicating hole 111b communicating with the fourth hydraulic flow path 214 may be formed at a rear side of the first pressure chamber 112. Also, a third communicating hole 111c communicating with the first dump flow path 116 may be further formed at the first pressure chamber 112.

Further, the second communicating hole 111b communicating with the fourth hydraulic flow path 214, and a fourth communicating hole 111d communicating with the second dump flow path 117 may be formed at the second pressure chamber 113.

Referring back to FIG. 1, flow paths 211, 212, 213, 214, 215, 216, and 217 and valves 231, 232, 233, 234, 235, 236, 241, 242, and 243, which are respectively connected to the first pressure chamber 112 and the second pressure chamber 113, will be described.

The second hydraulic flow path 212 may communicate with the first hydraulic pressure circuit 201, and the third hydraulic flow path 213 may communicate with the second hydraulic pressure circuit 202. Therefore, a hydraulic pressure may be delivered to both the first hydraulic pressure circuit 201 and the second hydraulic pressure circuit 202 while the hydraulic piston 114 is moved forward.

Also, the electric brake system 1 according to the embodiment of the present disclosure may include a first control valve 231 and a second control valve 232 which are respectively provided at the second and third hydraulic flow paths 212 and 213 and are respectively configured to control an oil flow.

Further, the first and second control valves 231 and 232 may be respectively configured with a check valve which enables oil to flow only in a direction from the first pressure chamber 112 to the first or second hydraulic pressure circuit 201 or 202, and blocks the oil from flowing in a reverse direction. That is, the first or second control valve 231 or 232 may enable the hydraulic pressure of the first pressure chamber 112 to be delivered to the first or second hydraulic pressure circuit 201 or 202, and prevent a hydraulic pressure of the first or second hydraulic pressure circuit 201 or 202 from leaking into the first pressure chamber 112 through the second or third hydraulic flow path 212 or 213.

Meanwhile, the fourth hydraulic flow path 214 may branch off into the fifth hydraulic flow path 215 and the sixth hydraulic flow path 216 at the middle of the fourth hydraulic flow path 214, thereby communicating with both the first hydraulic pressure circuit 201 and the second hydraulic pressure circuit 202. As one example, the fifth hydraulic flow path 215 branching off from the fourth hydraulic flow path 214 may communicate with the first hydraulic pressure circuit 201, and the sixth hydraulic flow path 216 branching off from the fourth hydraulic flow path 214 may communicate with the second hydraulic pressure circuit 202. Therefore, a hydraulic pressure may be delivered to both the first hydraulic pressure circuit 201 and the second hydraulic pressure circuit 202 while the hydraulic piston 114 is moved backward.

Also, the electric brake system 1 according to the embodiment of the present disclosure may include a third control valve 233 provided at the fifth hydraulic flow path 215 and configured to control an oil flow, and a fourth control valve 234 provided at the sixth hydraulic flow path 216 and configured to control an oil flow.

The third control valve 233 may be configured with a bidirectional control valve which controls an oil flow between the second pressure chamber 113 and the first hydraulic pressure circuit 201. Further, the third control valve 233 may be configured with a normally closed type solenoid valve that is usually closed and is open when an opening signal is received from the ECU.

Also, the fourth control valve 234 may be configured with a check valve which enables oil to flow only in a direction from the second pressure chamber 113 to the second hydraulic pressure circuit 202 and blocks oil from flowing in a reverse direction. That is, the fourth control valve 234 may prevent the hydraulic pressure of the second hydraulic pressure circuit 202 from leaking into the second pressure chamber 113 through the sixth hydraulic flow path 216 and the fourth hydraulic flow path 214.

Also, the electric brake system 1 according to the embodiment of the present disclosure may include a fifth control valve 235 provided at a seventh hydraulic flow path 217 connecting the second hydraulic flow path 212 to the third hydraulic flow path 213 and configured to control an oil flow, and a sixth control valve 236 provided at an eighth hydraulic flow path 218 connecting the second hydraulic flow path 212 to the seventh hydraulic flow path 217 and configured to control an oil flow. Further, the fifth control valve 235 and the sixth control valve 236 may be respectively configured with a normally closed type solenoid valve that is usually closed and is open when an opening signal is received from the ECU.

The fifth control valve 235 and the sixth control valve 236 may be operated to be open when the first control valve 231 or the second control valve 232 are operated abnormally, thereby enabling the hydraulic pressure of the first pressure chamber 112 to be delivered to both the first hydraulic pressure circuit 201 and the second hydraulic pressure circuit 202.

Further, the fifth control valve 235 and the sixth control valve 236 may be operated to be open when a hydraulic pressure of each of the wheel cylinders 40 is discharged and then delivered to the first pressure chamber 112. This is because the first control valve 231 and the second control valve 232 respectively provided at the second hydraulic flow path 212 and the third hydraulic flow path 213 are configured with check valves enabling oil to flow in one direction.

Also, the electric brake system 1 according to the embodiment of the present disclosure may further include a first dump valve 241 and a second dump valve 242 which are respectively provided at the first and second dump flow paths 116 and 117 and are configured to control an oil flow. The dump valves 241 and 242 may be check valves that are open in a direction from the reservoir 30 to the first and second pressure chambers 112 and 113, and are blocked in a reverse direction. That is, the first dump valve 241 may be a check valve that enables oil to flow from the reservoir 30 to the first pressure chamber 112 and blocks the oil from flowing from the first pressure chamber 112 to the reservoir 30, and the second dump valve 242 may be a check valve that enables oil to flow from the reservoir 30 to the second pressure chamber 113 and blocks the oil from flowing from the second pressure chamber 113 to the reservoir 30.

Also, the second dump flow path 117 may include a bypass flow path, and a third dump valve 243 may be installed at the bypass flow path to control an oil flow between the second pressure chamber 113 and the reservoir 30.

The third dump valve 243 may be configured with a solenoid valve capable of bidirectionally controlling an oil flow, and with a normally open type solenoid valve that is usually open and is closed when a closing signal is received from the ECU.

The hydraulic pressure supply unit 110 of the electric brake system 1 according to the embodiment of the present disclosure may operate with a double action. That is, a hydraulic pressure, which is generated in the first pressure chamber 112 while the hydraulic piston 114 is moved forward, may be delivered to the first hydraulic pressure circuit 201 through the first hydraulic flow path 211 and the second hydraulic flow path 212 to operate the wheel cylinders 40 installed at the front right wheel FR and the rear left wheel RL, and to the second hydraulic pressure circuit 202 through the first hydraulic flow path 211 and the third hydraulic flow path 213 to operate the wheel cylinders 40 installed at the rear right wheel RR and the front left wheel FL.

Similarly, a hydraulic pressure, which is generated in the second pressure chamber 113 while the hydraulic piston 114 is moved backward, may be delivered to the first hydraulic pressure circuit 201 through the fourth hydraulic flow path 214 and the fifth hydraulic flow path 215 to operate the wheel cylinders 40 installed at the front right wheel FR and the rear left wheel RL, and to the second hydraulic pressure circuit 202 through the fourth hydraulic flow path 214 and the sixth hydraulic flow path 216 to operate the wheel cylinders 40 installed at the rear right wheel RR and the front left wheel FL.

Also, a negative pressure, which is generated in the first pressure chamber 112 while the hydraulic piston 114 is moved backward, may cause oil in the wheel cylinders 40 installed at the front right wheel FR and the rear left wheel RL to be suctioned and delivered to the first pressure chamber 112 through the first hydraulic pressure circuit 201, the second hydraulic flow path 212, and the first hydraulic flow path 211, and may cause oil in the wheel cylinders 40 installed at the rear right wheel RR and the front left wheel FL to be suctioned and delivered to the first pressure chamber 112 through the second hydraulic pressure circuit 202, the third hydraulic flow path 213, and the first hydraulic flow path 211.

Next, the motor 120 and the power converter 130 of the hydraulic pressure supply device 100 will be described.

The motor 120 is a device configured to generate a rotational force according to a signal output from the ECU (not shown) and may generate the rotational force in a forward or backward direction. An angular velocity and a rotational angle of the motor 120 may be precisely controlled. Since such a motor 120 is generally known in the related art, a detailed description thereof will be omitted.

Meanwhile, the ECU controls not only the motor 120 but also valves 54, 60, 221a, 221b, 221c, 221d, 222a, 222b, 222c, 222d, 233, 235, 236, and 243 provided at the electric brake system 1 of the present disclosure, which will be described below. An operation of controlling a plurality of valves according to a displacement of the brake pedal 10 will be described below.

A driving force of the motor 120 generates a displacement of the hydraulic piston 114 through the power converter 130, and a hydraulic pressure, which is generated while the hydraulic piston 114 slides inside the pressure chamber, is delivered to the wheel cylinder 40 installed at each of the wheels RR, RL, FR, and FL through the first and second hydraulic flow paths 211 and 212.

The power converter 130 is a device configured to convert a rotational force into a rectilinear movement, and, as one example, it may be configured with a worm shaft 131, a worm wheel 132, and the driving shaft 133.

The worm shaft 131 may be integrally formed with a rotational shaft of the motor 120, and rotates the worm wheel 132 by being engaged therewith and coupled thereto through a worm that is formed on an outer circumferential surface of the worm shaft 131. The worm wheel 132 linearly moves the driving shaft 133 by being engaged therewith and coupled thereto, and the driving shaft 133 is connected to the hydraulic piston 114 to slide the hydraulic piston 114 inside the cylinder block 111.

To describe such operations again, a signal, which is sensed by the pedal displacement sensor 11 when a displacement occurs at the brake pedal 10, is transmitted to the ECU (not shown) and then the ECU drives the motor 120 in one direction to rotate the worm shaft 131 in the one direction. A rotational force of the worm shaft 131 is transmitted to the driving shaft 133 via the worm wheel 132, and then the hydraulic piston 114 connected to the driving shaft 133 is moved forward to generate a hydraulic pressure in the first pressure chamber 112.

On the other hand, when the pedal effort is released from the brake pedal 10, the ECU drives the motor 120 in a reverse direction, and thus the worm shaft 131 is reversely rotated. Consequently, the worm wheel 132 is also reversely rotated, and thus a negative pressure is generated in the first pressure chamber 112 while the hydraulic piston 114 connected to the driving shaft 133 is returned to its original position, that is, moved backward.

Meanwhile, it is possible for generation of the hydraulic pressure and the negative pressure to be opposite to that which is described above. That is, a signal, which is sensed by the pedal displacement sensor 11 when a displacement occurs at the brake pedal 10, is transmitted to the ECU (not shown) and then the ECU drives the motor 120 in a reverse direction to rotate the worm shaft 131 in the reverse direction. A rotational force of the worm shaft 131 is transmitted to the driving shaft 133 via the worm wheel 132, and then the hydraulic piston 114 connected to the driving shaft 133 is moved backward to generate a hydraulic pressure in the second pressure chamber 113.

On the other hand, when the pedal effort is released from the brake pedal 10, the ECU drives the motor 120 in one direction, and thus the worm shaft 131 is rotated in the one direction. Consequently, the worm wheel 132 is also reversely rotated, and thus a negative pressure is generated in the second pressure chamber 113 while the hydraulic piston 114 connected to the driving shaft 133 is returned to its original position, that is, moved forward.

As is described above, the hydraulic pressure supply device 100 serves to deliver the hydraulic pressure to the wheel cylinders 40 or to suction and deliver the hydraulic pressure to the reservoir 30 according to a rotational direction of the rotational force generated from the motor 120.

Meanwhile, when the motor 120 is rotated in the one direction, the hydraulic pressure may be generated in the first pressure chamber 112 or the negative pressure may be generated in the second pressure chamber 113, and whether the hydraulic pressure is used for braking or the negative pressure is used for releasing braking may be determined through the control of the valves 54, 60, 221a, 221b, 221c, 221d, 222a, 222b, 222c, 222d, 233, 235, 236, and 243. This will be described in detail below.

Although not shown in the drawing, the power converter 130 may be configured with a ball screw nut assembly. For example, the power converter 130 may be configured with a screw which is integrally formed with the rotational shaft of the motor 120 or is connected to and rotated with the rotational shaft thereof, and a ball nut which is screw-coupled to the screw in a state in which a rotation of the ball nut is restricted to perform a rectilinear movement according to a rotation of the screw. The hydraulic piston 114 is connected to the ball nut of the power converter 130 to pressurize the pressure chamber by the rectilinear movement of the ball nut. Such a ball screw nut assembly is a device configured to convert a rotational movement into a rectilinear movement, and a structure thereof is generally known in the related art so that a detailed description thereof will be omitted.

Further, it should be understood that the power converter 130 according to the embodiment of the present disclosure may employ any structure capable of converting a rotational movement into a rectilinear movement in addition to the structure of the ball screw nut assembly.

Also, the electric brake system 1 according to the embodiment of the present disclosure may further include the first and second backup flow paths 251 and 252 capable of directly supplying oil discharged from the master cylinder 20 to the wheel cylinders 40 when the hydraulic pressure supply device 100 operates abnormally.

The first cut valve 261 configured to control an oil flow may be provided at the first backup flow path 251, and the second cut valve 262 configured to control an oil flow may be provided at the second backup flow path 252. Also, the first backup flow path 251 may connect the first hydraulic pressure port 24a to the first hydraulic pressure circuit 201, and the second backup flow path 252 may connect the second hydraulic pressure port 24b to the second hydraulic pressure circuit 202.

Further, the first and second cut valves 261 and 262 may be respectively configured with a normally open type solenoid valve that is usually open and is closed when a closing signal is received from the ECU.

Next, the hydraulic pressure control unit 200 according to the embodiment of the present disclosure will be described with reference to FIG. 1.

The hydraulic pressure control unit 200 may be configured with the first hydraulic pressure circuit 201 and the second hydraulic pressure circuit 202 which each receive a hydraulic pressure and controls two wheels. As one example, the first hydraulic pressure circuit 201 may control the front right wheel FR and the rear left wheel RL, and the second hydraulic pressure circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic pressure circuit 201 is connected to the first hydraulic flow path 211 and the second hydraulic flow path 212 to receive a hydraulic pressure supplied from the hydraulic pressure supply device 100, and the second hydraulic flow path 212 branches off into two flow paths which are respectively connected to the front right wheel FR and the rear left wheel RL. Similarly, the second hydraulic pressure circuit 202 is connected to the first hydraulic flow path 211 and the third hydraulic flow path 213 to receive the hydraulic pressure supplied from the hydraulic pressure supply device 100, and the third hydraulic flow path 213 branches off into two flow paths which are respectively connected to the front left wheel FL and the rear right wheel RR.

The hydraulic pressure circuits 201 and 202 may be provided with a plurality of inlet valves 221 (that is, 221a, 221b, 221c, and 221d) to control delivery of the hydraulic pressure. As one example, two inlet valves 221a and 221b may be provided at the first hydraulic pressure circuit 201 and connected to the first hydraulic flow path 211 to respectively control the hydraulic pressure delivered to two of the wheel cylinders 40. Also, two inlet valves 221c and 221d may be provided at the second hydraulic pressure circuit 202 and connected to the second hydraulic flow path 212 to respectively control the hydraulic pressure delivered to two of the wheel cylinders 40.

Further, the plurality of inlet valves 221 may be disposed at an upstream side of each of the wheel cylinders 40 and may be configured with normally open type solenoid valves that are usually open and are closed when a closing signal is received from the ECU.

Also, the hydraulic pressure circuits 201 and 202 may include check valves 223a, 223b, 223c, and 223d which each are provided at a bypass flow path connecting a front side to a rear side of each of the inlet valves 221a, 221b, 221c, and 221d. Each of the check valves 223a, 223b, 223c, and 223d may be provided to enable oil to flow only in a direction from the wheel cylinder 40 to the hydraulic pressure supply unit 110 and block oil from flowing in a direction from the hydraulic pressure supply unit 110 to the wheel cylinder 40. Each of the check valves 223a, 223b, 223c, and 223d may be operated to rapidly discharge a braking pressure from the wheel cylinder 40, and enable the hydraulic pressure of the wheel cylinder 40 to be delivered to the hydraulic pressure supply unit 110 when the inlet valves 221a, 221b, 221c, and 221d are operated abnormally.

Also, the hydraulic pressure circuits 201 and 202 may be further provided with a plurality of outlet valves 222 (that is, 222a, 222b, 222c, and 222d) connected to the reservoirs 30 to improve brake release performance when braking is released. Each of the outlet valves 222 is connected to the wheel cylinder 40 to control discharging of the hydraulic pressure from each of the wheels RR, RL, FR, and FL. That is, when a braking pressure of each of the wheels RR, RL, FR, and FL is measured and a decompression of the braking is determined to be required, the outlet valves 222 may be selectively open to control the braking pressure.

Further, the outlet valves 222 may be configured with normally closed type solenoid valves that are usually closed and are open when an opening signal is received from the ECU.

In addition, the hydraulic pressure control unit 200 may be connected to the backup flow paths 251 and 252. As one example, the first hydraulic pressure circuit 201 may be connected to the first backup flow path 251 to receive the hydraulic pressure provided from the master cylinder 20, and the second hydraulic pressure circuit 202 may be connected to the second backup flow path 252 to receive the hydraulic pressure provided from the master cylinder 20.

At this point, the first backup flow path 251 may be connected to the first hydraulic pressure circuit 201 at an upstream side of each of the first and second inlet valves 221a and 221b. Similarly, the second backup flow path 252 may be connected to the second hydraulic pressure circuit 202 at an upstream side of each of the third and fourth inlet valves 221c and 221d. Consequently, when the first and second cut valves 261 and 262 are closed, the hydraulic pressure provided from the hydraulic pressure supply device 100 may be supplied to the wheel cylinders 40 through the first and second hydraulic pressure circuits 201 and 202, and, when the first and second cut valves 261 and 262 are open, the hydraulic pressure provided from the master cylinder 20 may be supplied to the wheel cylinders 40 through the first and second backup flow paths 251 and 252. At this point, since the plurality of inlet valves 221a, 221b, 221c, and 221d are respectively in an open state, there is no need to switch their operation states.

Meanwhile, an undescribed reference number "PS11" is a first hydraulic flow path pressure sensor configured to sense a hydraulic pressure of the first hydraulic pressure circuit 201, an undescribed reference number "PS12" is a second hydraulic flow path pressure sensor configured to sense a hydraulic pressure of the second hydraulic pressure circuit 202, and an undescribed reference number "PS2" is a backup flow path pressure sensor configured to sense an oil pressure of the master cylinder 20. Further, an undescribed reference number "MPS" is a motor control sensor configured to control a rotational angle or a current of the motor 120.

Hereinafter, an operation of the electric brake system 1 according to the embodiment of the present disclosure will be described in detail.

The hydraulic pressure supply device 100 may discriminately operate in a low pressure mode and a high pressure mode. The low pressure mode and the high pressure mode are interchangeable with each other by changing an operation of the hydraulic pressure control unit 200. The hydraulic pressure supply device 100 may operate in the high pressure mode, thereby generating a high hydraulic pressure without increasing an output of the motor 120. Therefore, a stable braking force may be secured while reducing costs and a weight of a brake system.

To describe in more detail, a hydraulic pressure is generated in the first pressure chamber 112 while the hydraulic piston 114 is moved forward. As the hydraulic piston 114 is moved forward in an initial stage, that is, a stroke of the hydraulic piston 114 is increased, an amount of oil delivered from the first pressure chamber 112 to the wheel cylinders 40 is increased to raise a braking pressure. However, since there is an active stroke of the hydraulic piston 114, a maximum pressure due to the forward movement of the hydraulic piston 114 exists.

At this point, a maximum pressure in the low pressure mode is less than that in the high pressure mode. However, comparing the high pressure mode with the low pressure mode, an increase rate in pressure per stroke of the hydraulic piston 114 in the high pressure mode is less than that in the low pressure mode. The reason for that is that a portion of oil discharged from the first pressure chamber 112 flows in the second pressure chamber 113 instead of that the discharged oil entirely flows in the wheel cylinders 40. This will be described in detail with reference to FIG. 5.

Therefore, the low pressure mode in which an increase rate in pressure per stroke is large may be executed at an initial stage of braking where braking responsiveness is important, whereas the high pressure mode in which a maximum pressure is large may be executed at a post-initial stage of braking where a maximum braking force is important.

Figure 4:
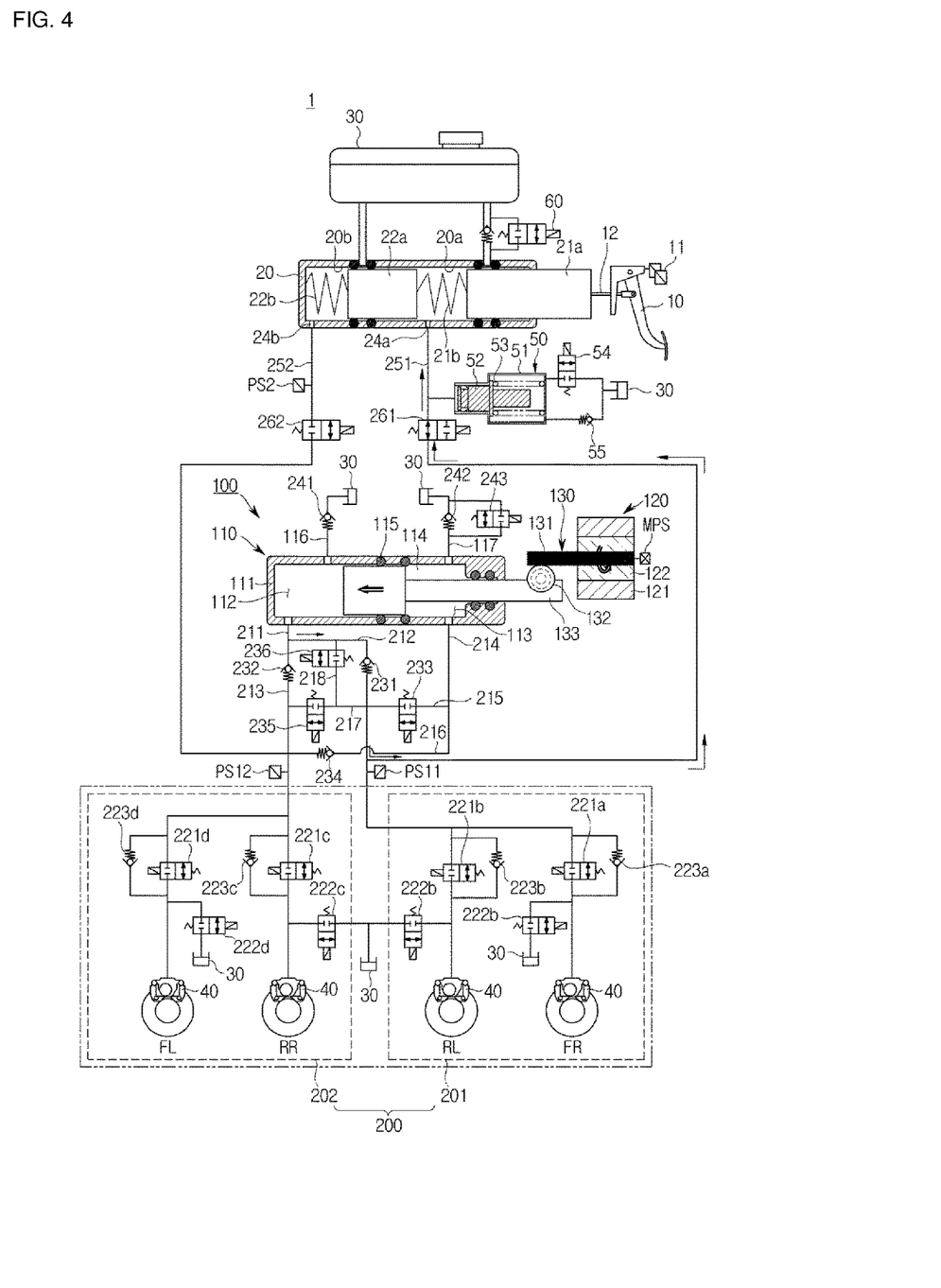
FIG. 4 is a hydraulic pressure circuit diagram illustrating a state in which the electric brake system according to the embodiment of the present disclosure inspects whether the master cylinder is stuck.

FIG. 4 is a hydraulic pressure circuit diagram illustrating a state in which the electric brake system 1 according to the embodiment of the present disclosure inspects whether the master cylinder 20 is stuck.

As shown in FIG. 4, in the case of determining whether the second piston 22a of the master cylinder 20 is stuck thereinside, the second cut valve 262 is switched to a closed state and the inspection valve 60 is switched to a closed state in a state in which each of the valves 54, 60, 221a, 221b, 221c, 221d, 222a, 222b, 222c, 222d, 233, 235, 236, 243, 261, and 262 is provided in an initial state of braking, that is, a non-operating state. Further, the hydraulic pressure supply device 100 operates to generate a hydraulic pressure.

Thereafter, a measured value of the first or second hydraulic flow path pressure sensor PS11 or PS12, which senses a hydraulic pressure of the first or second hydraulic pressure circuit 201 or 202, is compared to that of the backup flow path pressure sensor PS2 configured to measure an oil pressure of the master cylinder 20.

As a result, when the measured value of the first or second hydraulic flow path pressure sensor PS11 or PS12 is greater than that of the backup flow path pressure sensor PS2, the second piston 22a of the master cylinder 20 may be determined to be stuck inside the master cylinder 20. That is, when a pressure formed through delivery of the hydraulic pressure, which is generated in the first pressure chamber 112 of the hydraulic pressure supply unit 110, to the master cylinder 20 via the first backup flow path 251 and the first cut valve 261 is less than that formed through delivery of the hydraulic pressure, which is generated in the first pressure chamber 112 of the hydraulic pressure supply unit 110, to the first or second hydraulic pressure circuit 201 or 202, the second piston 22a may be determined to be stuck not to form a pressure in the second backup flow path 252, or to form a pressure that is less than that formed in the first backup flow path 251.

Figure 5:
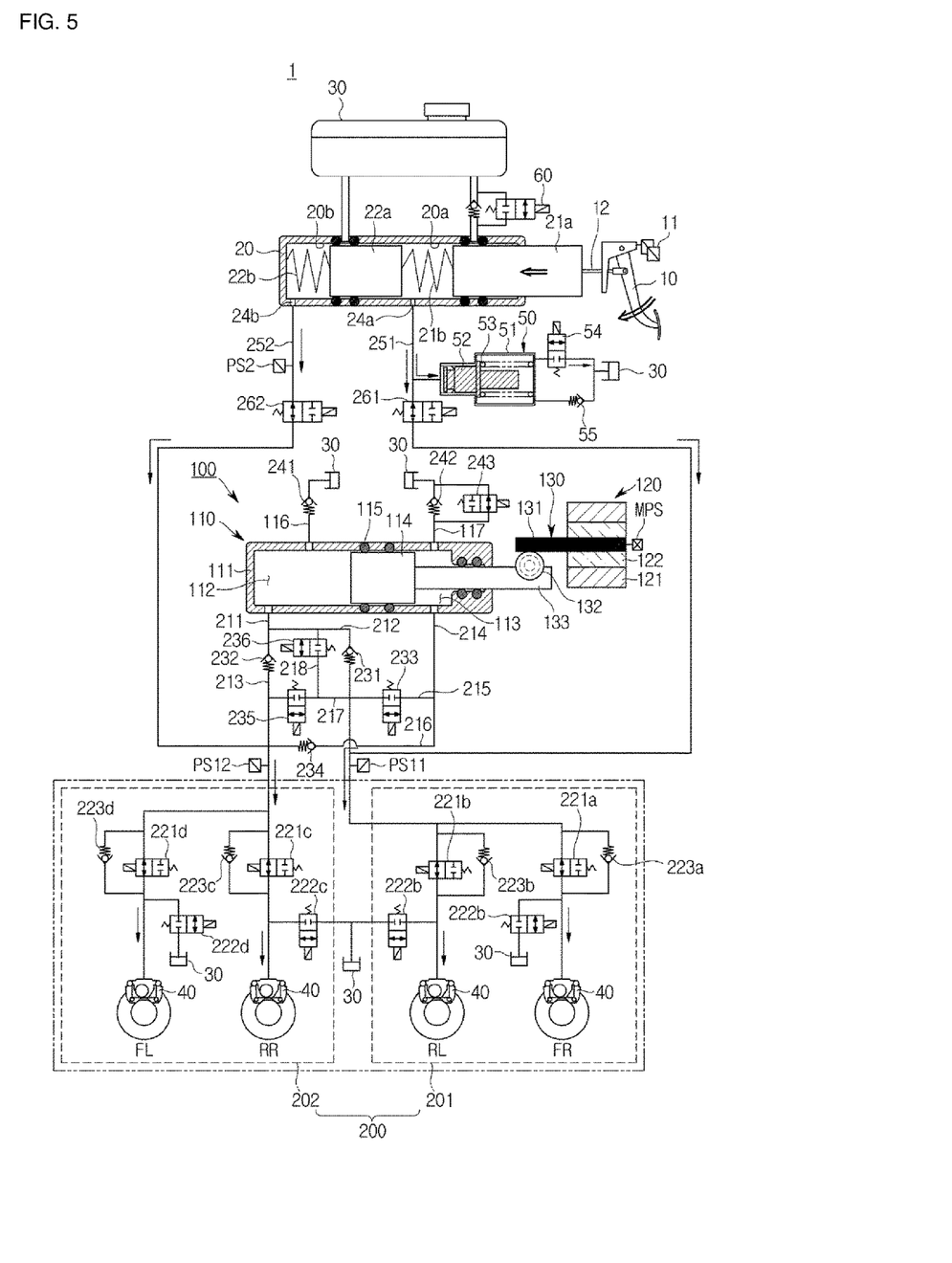
FIG. 5 is a hydraulic pressure circuit diagram illustrating a state in which the electric brake system according to the embodiment of the present disclosure inspects whether a leak occurs at the master cylinder.

FIG. 5 is a hydraulic pressure circuit diagram illustrating a state in which the electric brake system 1 according to the embodiment of the present disclosure inspects whether a leak occurs at the master cylinder 20.

As shown in FIG. 5, in the case of determining whether a leak occurs at the sealing member 25 provided between the first piston 21a and the master cylinder 20, a driver steps on the brake pedal 10 to form a hydraulic pressure in the master cylinder 20 in a state in which each of the valves 54, 60, 221a, 221b, 221c, 221d, 222a, 222b, 222c, 222d, 233, 235, 236, 243, 261, and 262 is provided in an initial state of braking, that is, a non-operating state. At this point, a target pressure Target P or a pressure which is expected to be formed inside the master cylinder 20 is compared to a measured value of the first or second hydraulic flow path pressure sensor PS11 or PS12.

As a result, when the measured value of the first or second hydraulic flow path pressure sensor PS11 or PS12 is less than the target pressure Target P or the pressure which is expected to be formed inside the master cylinder 20, the inspection valve 60 is switched again to the closed state and then the above described process is repeated.

On the other hand, when the measured value of the first or second hydraulic flow path pressure sensor PS11 or PS12 is equal to the target pressure Target P or the pressure which is expected to be formed inside the master cylinder 20 after the inspection valve 60 is closed, it may be determined that a leak occurs at the sealing member 25 provided at an outer surface of the first piston 21a of the master cylinder 20. That is, a portion of the pressure, which is formed in the first master chamber 20a while the first piston 21a is moved forward, may be determined to leak into the reservoir 30 through the sealing member 25.

When the leak occurs at the sealing member 25, the hydraulic pressure required by the driver may not be delivered to the wheel cylinders 40 when emergency braking is performed. Therefore, when the leak is determined to occur at the sealing member 25, the inspection valve 60 may be switched to the closed state when emergency braking is performed, thereby preventing the hydraulic pressure inside the master cylinder 20 from leaking into the reservoir 30.

Next, a structure of the inspection valve 60 according to the embodiment of the present disclosure will be described with reference to FIGS. 6 to 8.

Figure 6:
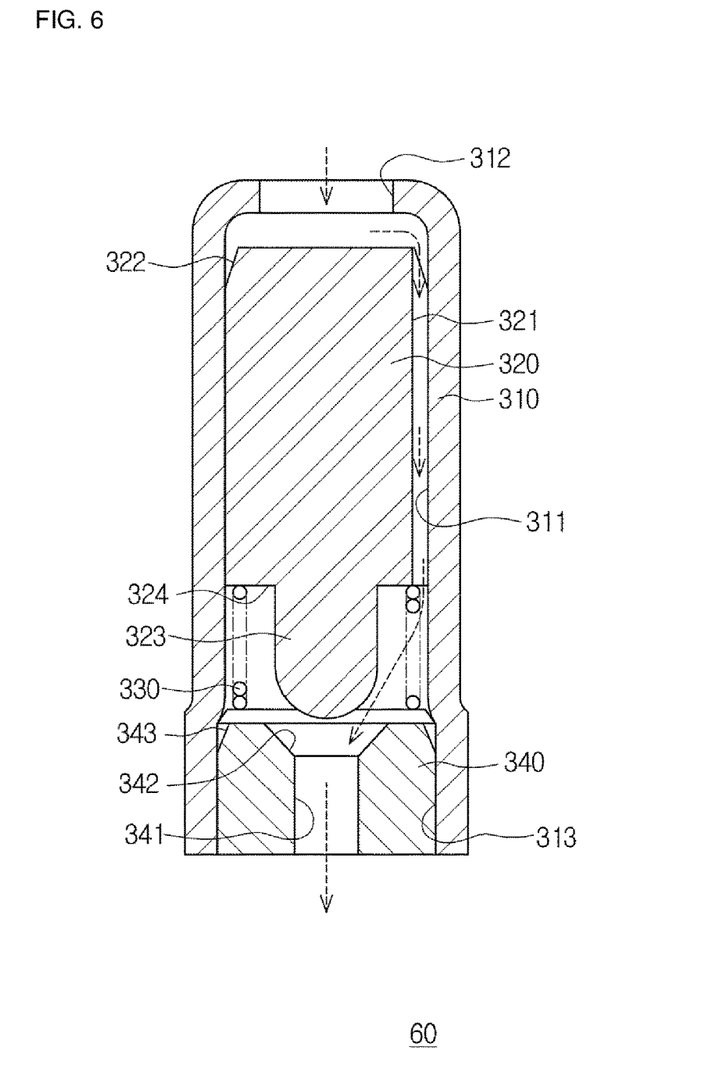
FIG. 6 is a cross-sectional view illustrating an open state of the inspection valve according to the embodiment of the present disclosure.
Figure 7:
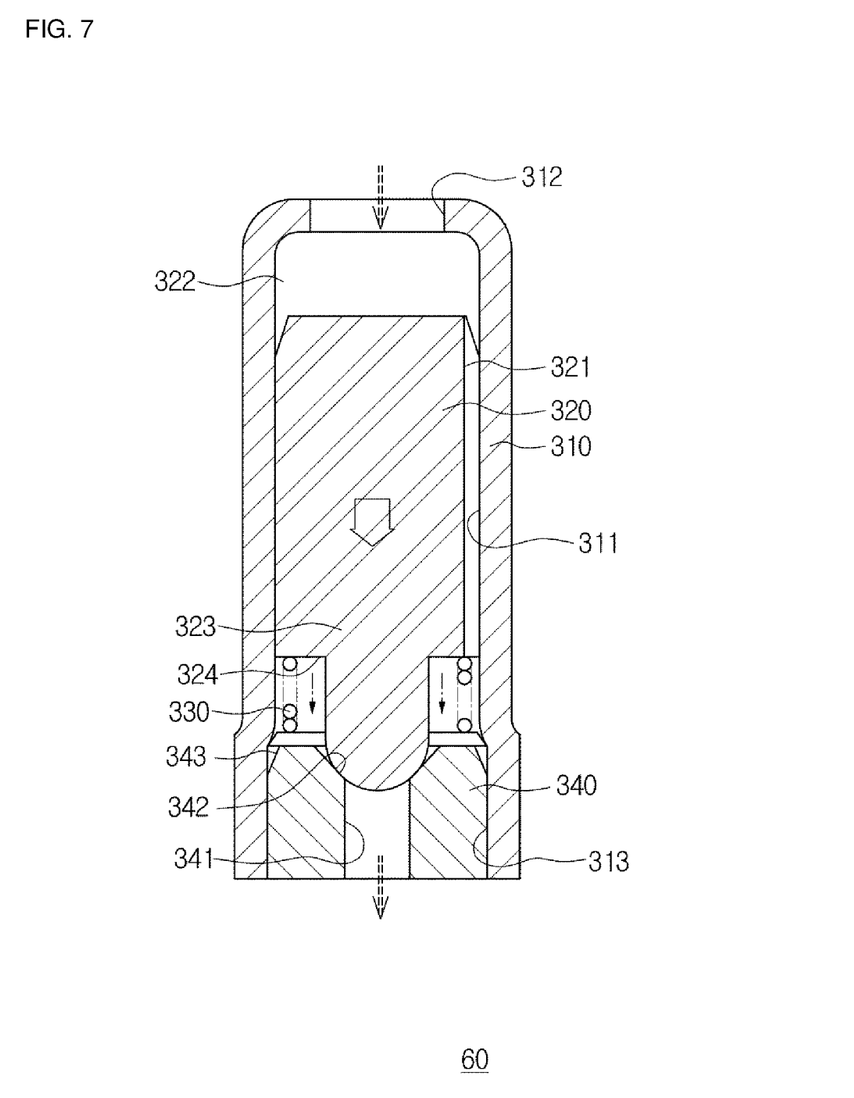
FIG. 7 is a cross-sectional view illustrating a closed state of the inspection valve according to the embodiment of the present disclosure.

FIG. 6 is a cross-sectional view illustrating an open state of the inspection valve 60 according to the embodiment of the present disclosure, and FIG. 7 is a cross-sectional view illustrating a closed state of the inspection valve 60 according to the embodiment of the present disclosure.

The inspection valve 60 according to the embodiment of the present disclosure may include a housing 310, a plunger 320 accommodated inside the housing 310, a seat member 340 configured to close one side of the housing 310, and an elastic member 330 interposed between the plunger 320 and the seat member 340.

The housing 310 is provided to include bores 311 and 313 formed thereinside, and both sides of each of the bores 311 and 313 are open. In particular, one end surface of the housing 310 is open so that an inlet hole 312 is formed, and the other end surface thereof is open so that the seat member 340 is inserted into and passes through the other end surface to form an outlet hole 341. That is, the bores 311 and 313 are provided to communicate the inlet hole 312 with the outlet hole 341. At this point, the inlet hole 312 is connected to the first master chamber 20a of the master cylinder 20, and the outlet hole 341 is connected to the reservoir 30.

Also, the housing 310 may be provided in a generally hollow cylindrical shape. As one example, the housing 310 may be formed by a pressing process. Further, an inner diameter of the inlet hole 312 may be smaller than that of each of the bores 311 and 313.

The bores 311 and 313 may include a first bore 311 and a second bore 313 which each have a different inner diameter in a length direction. As one example, the housing 310 may include the first bore 311 communicating with the inlet hole 312, and the second bore 313 forming a step with respect to the first bore 311 and having an inner diameter that is greater than that of the first bore 311. The first bore 311 is provided to enable the plunger 320 to slide and move, and the second bore 313 is provided to enable the seat member 340 to be inserted and fixed.

Figure 8:
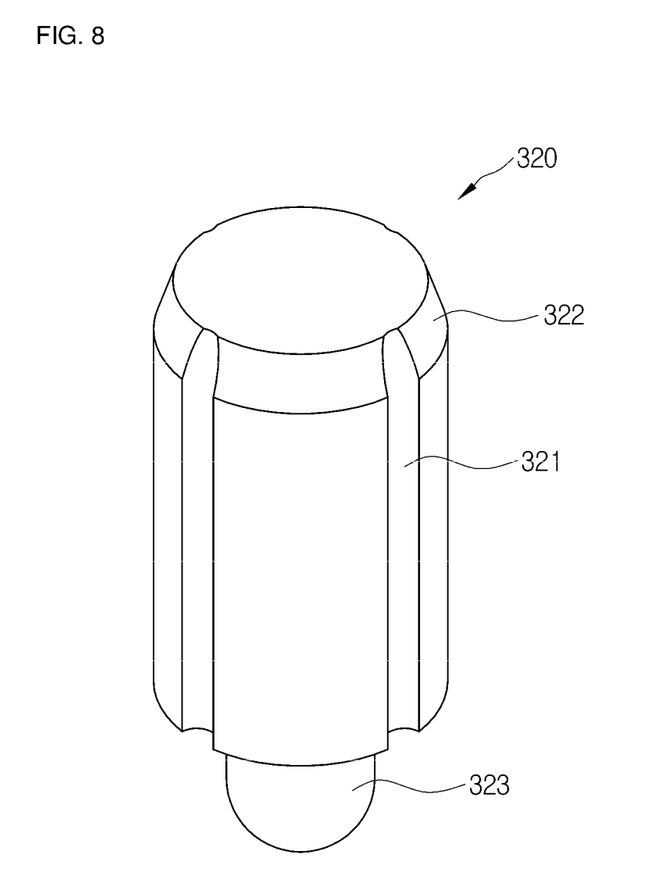
FIG. 8 is a perspective view of the plunger 320.

FIG. 8 is a perspective view of the plunger 320.

Referring to FIG. 8, the plunger 320 is inserted inside the first bore 311, and is disposed to be guided along an inner surface of the first bore 311 and then to be reciprocally moved in a length direction. Further, the plunger 320 may be provided in a generally cylindrical shape. As one example, the plunger 320 may be formed by a forging process. Further, an outer diameter of the plunger 320 may be provided to be close to the inner diameter of the first bore 311.

Further, a slit 321 may be provided at an outer surface of the plunger 320 in a length direction of the first bore 311. The slit 321 may be connected from one side of the plunger 320 to the other side thereof, and oil flowing in through the inlet hole 312 may flow toward an opposite side along the slit 321 of the plunger 320. Although only a single slit 321 is shown in the drawing, a plurality of slits 321 may be formed along a circumferential direction of the plunger 320.

Also, an inclined part 322 may be provided at one surface of the plunger 320. The inclined part 322 may be formed at an edge of a front end part of the plunger 320 along a circumference thereof. Since the inclined part 322 is provided at the front end part of the plunger 320, the plunger 320 may easily enter inside the first bore 311 and further oil may flow in the slit 321 along the inclined part 322.

Also, an opening and closing protrusion 323 may protrude from the other surface of the plunger 320. Further, the opening and closing protrusion 323 may be provided to protrude from the center of the other surface of the plunger 320. Also, an end part of the opening and closing protrusion 323 may be provided with a curved surface. As one example, the end part of the opening and closing protrusion 323 may have a shape in the form of a portion of a spherical surface.

Also, a supporting surface 324 may be provided at the other surface of the plunger 320 to support one side of the elastic member 330 along a periphery of the opening and closing protrusion 323.

Referring back to FIGS. 18 and 19, the seat member 340 may be inserted into and fixed to the second bore 313. As one example, the seat member 340 may be press inserted into and fixed to the second bore 313. Further, the seat member 340 may be provided in a generally cylindrical shape. As one example, the seat member 340 may be formed by a forging process.

Also, the seat member 340 may include the outlet hole 341 passing through in a length direction of the second bore 313. Further, a seating part 342 may be formed at an inlet side of the outlet hole 341 and may be provided to be inclined along a circumference of the inlet side. As one example, the seating part 342 may have a trumpet shape. Further, the opening and closing protrusion 323 is seated at the seating part 342 so that the outlet hole 341 is blocked.

Also, an inclined part 343 may be provided at one surface of the seat member 340. The inclined part 343 may be formed at an edge of a front end part of the seat member 340 along a circumference thereof. Since the inclined part 343 is provided at the front end part of the seat member 340, the seat member 340 may easily enter inside the second bore 313.

Next, an operating method of the inspection valve 60 according to the embodiment of the present disclosure will be described.

Referring to FIG. 6, the inspection valve 60 is provided, as usual, in an open state. At this point, the "as usual" refers to a case in which an external force is not applied to the plunger 320, or a case in which an external force that is less than an elastic force of the elastic member 330 is applied to the plunger 320. That is, the plunger 320 is maintained in a state of being pushed upward by the elastic member 330 of which one side is supported by the seat member 340 such that the opening and closing protrusion 323 is spaced apart from the seating part 342 and the outlet hole 341 is open.

Therefore, oil flowing in through the inlet hole 312 may flow toward the outlet hole 341 along the first bore 311 and the slit 321 of the plunger 320.

Referring to FIG. 7, the inspection valve 60 may block the flow paths using flow resistance as necessary. At this point, the "as necessary" refers to a case in which an external force that is greater than the elastic force of the elastic member 330 is applied, and flow resistance, which is generated when a large flow rate of oil is supplied instantaneously, pressurizes the plunger 320. That is, the plunger 320 is moved downward by the large flow rate of oil as overcoming the elastic force of the elastic member 330, and the opening and closing protrusion 323 is seated on the seating part 342 to block the outlet hole 341.

Further, when the flow resistance is less than the elastic force of the elastic member 330 as the flow rate of oil decreases, the plunger 320 is moved upward by the elastic force of the elastic member 330 such that the outlet hole 341 is open again.

As is apparent from the above description, the electric brake system according to the embodiments of the present disclosure is capable of sensing a leak of the seal of the master cylinder, a stuck state of the piston, and a leak of the simulator valve by operating the inspection valve to execute the inspection mode.

Also, when braking is released, flow paths may be formed to release a hydraulic pressure of the master cylinder.

Also, the inspection valve may be provided in the form of a pilot valve, thereby simplifying a structure of the inspection valve and reducing costs and a weight of the inspection valve.

Although embodiments have been described with reference to a number of illustrative embodiments thereof, it will be understood by those skilled in the art that various changes in form and details may be made therein without departing from the spirit and scope of the invention as defined by the appended claims.

What is claimed is:

1. An inspection valve installed at a flow path connecting a reservoir to a chamber of a master cylinder, comprising:
   a housing at which a bore is formed and having one side at which an inlet hole is formed;
   a plunger provided to be movable along the bore of the housing;
   a seat member configured to close one side of the bore and through which an outlet hole passes; and
   an elastic member having one side supported by the plunger and the other side supported by the seat member,
   wherein the plunger comprises a slit provided at an outer surface of the plunger in a length direction of the bore so that oil flowing in through the inlet hole flows toward an opposite side of the plunger along the slit.

2. The inspection valve of claim 1, wherein the bore includes a first bore adjacent to the inlet hole, and a second bore at which the seat member comprising the outlet hole is disposed, the second bore of the housing having an inner diameter that is greater than an inner diameter of the first bore of the housing.

3. The inspection valve of claim 1, wherein an opening and closing member protrudes from one side of the plunger, and
   the plunger is provided to be moved by the hydraulic pressure, thereby enabling the opening and closing member to block the outlet hole.

4. The inspection valve of claim 3, wherein the seat member includes a seating part that is provided to extend from one side of the outlet hole, and
   the opening and closing member is seated at the seating part to block the outlet hole.

5. The inspection valve of claim 1, wherein the inlet hole communicates with the chamber of the master cylinder, and the outlet hole communicates with the reservoir.

6. The inspection valve of claim 1, wherein the plunger is provided to block the outlet hole when a hydraulic pressure flowing in through the inlet hole is greater than an elastic force of the elastic member.

7. The inspection valve of claim 1, wherein an inclined part is formed at an edge of the seat member along a circumference of the seat member.

8. An inspection valve installed at a bypass flow path connecting a front side of a check valve to a rear side thereof at a reservoir flow path connecting a reservoir to a master cylinder, comprising:
- a housing at which a bore is formed and having one side at which an inlet hole communicating with the master cylinder is formed;
- a plunger provided to be movable along the bore of the housing;
- a seat member configured to close one side of the bore and through which an outlet hole communicating with the reservoir passes; and
- an elastic member having one side supported by the plunger and the other side supported by the seat member,
- wherein the check valve is provided at the reservoir flow path and enables fluid to flow in a direction from the reservoir to the master cylinder, and
- wherein the plunger comprises a slit provided at an outer surface of the plunger in a length direction of the bore so that oil flowing in through the inlet hole flows toward an opposite side of the plunger along the slit.

9. The inspection valve of claim 8, wherein an opening and closing member protrudes from one side of the plunger, and
- the plunger is provided to be moved by the hydraulic pressure, thereby enabling the opening and closing member to block the outlet hole.

10. The inspection valve of claim 9, wherein the seat member includes a seating part that is provided to extend from one side of the outlet hole, and
- the opening and closing member is seated at the seating part to block the outlet hole.

11. The inspection valve of claim 8, wherein the slit of the plunger is formed from one end and to an other end of the plunger.

12. The inspection valve of claim 8, the plunger is provided to block the outlet hole when a hydraulic pressure flowing in through the inlet hole is greater than an elastic force of the elastic member.

13. The inspection valve of claim 8, wherein the slit of the plunger is formed from one end and to an other end of the plunger.

14. The inspection valve of claim 8, wherein an inclined part is formed at an edge of the seat member along a circumference of the seat member.

15. The inspection valve of claim 8, wherein the bore of the housing comprises a first bore adjacent to the inlet hole and a second bore at which the seat member comprising the outlet hole is disposed, the second bore of the housing having an inner diameter which is greater than an inner diameter of the first bore of the housing.

* * * * *